United States Patent [19]

Garuglieri

[11] Patent Number: 5,189,937
[45] Date of Patent: Mar. 2, 1993

[54] CIRCULAR SAW ARRANGEMENT

[75] Inventor: Andrea Garuglieri, Colle Brianza, Italy

[73] Assignee: Black & Decker, Inc., Newark, Del.

[21] Appl. No.: 840,791

[22] Filed: Feb. 24, 1992

[30] Foreign Application Priority Data

Feb. 28, 1991 [DE] Fed. Rep. of Germany ....... 4106635

[51] Int. Cl.⁵ .......................... B26D 1/16; B26D 1/18
[52] U.S. Cl. .................................. 83/471.3; 83/477.1; 83/477.2; 83/486.1
[58] Field of Search .................. 83/471.3, 486.1, 485, 83/486, 529, 530, 477.2, 477.1

[56] References Cited

U.S. PATENT DOCUMENTS

| | | | |
|---|---|---|---|
| 2,851,068 | 9/1958 | Goodlet | 83/471.3 |
| 3,465,793 | 9/1969 | Zuk | 83/477.2 X |
| 4,152,961 | 5/1979 | Batson | 83/471.3 |
| 4,465,114 | 8/1984 | Schumacher | 144/286 R |
| 4,531,441 | 7/1985 | Bergler | 83/471.3 |
| 4,537,105 | 8/1985 | Bergler | 83/486.1 X |

FOREIGN PATENT DOCUMENTS

| | | |
|---|---|---|
| 0058775 | 9/1982 | European Pat. Off. . |
| 0242733 | 10/1987 | European Pat. Off. . |
| 1628992 | 11/1971 | Fed. Rep. of Germany . |
| 3347920 | 8/1985 | Fed. Rep. of Germany . |

OTHER PUBLICATIONS

Elu Sales Pamphlet, publication date unknown, but before invention.
European Search Report dated May 20, 1992.

*Primary Examiner*—Frank T. Yost
*Assistant Examiner*—Kenneth E. Peterson
*Attorney, Agent, or Firm*—Dennis A. Dearing; Charles E. Yocum; Edward D. C. Bartlett

[57] ABSTRACT

A circular saw arrangement has a table top pivotally mounted on a frame between a first chop saw position in which its first side faces upwardly and a second table saw position in which a second side faces upwardly. A support element is rotatably mounted on the table plate and carries a circular saw unit having a saw blade which in the chop saw position of the table plate can be moved downwardly from the raised position to cut a workpiece, and can also be moved to a mitre cutting position. In the inverted table saw position of the plate, the saw unit is below the table plate with the saw blade extending upwardly through a slot in the support element which extends across a part of the table plate. An opening is provided in the table plate, this opening in a central position of the saw blade being overlaid by at least a portion of the slot with the saw blade extending upwardly through both the opening and the slot. The saw blade in the chop saw position is movable longitudinally along the slot in the support element.

7 Claims, 20 Drawing Sheets

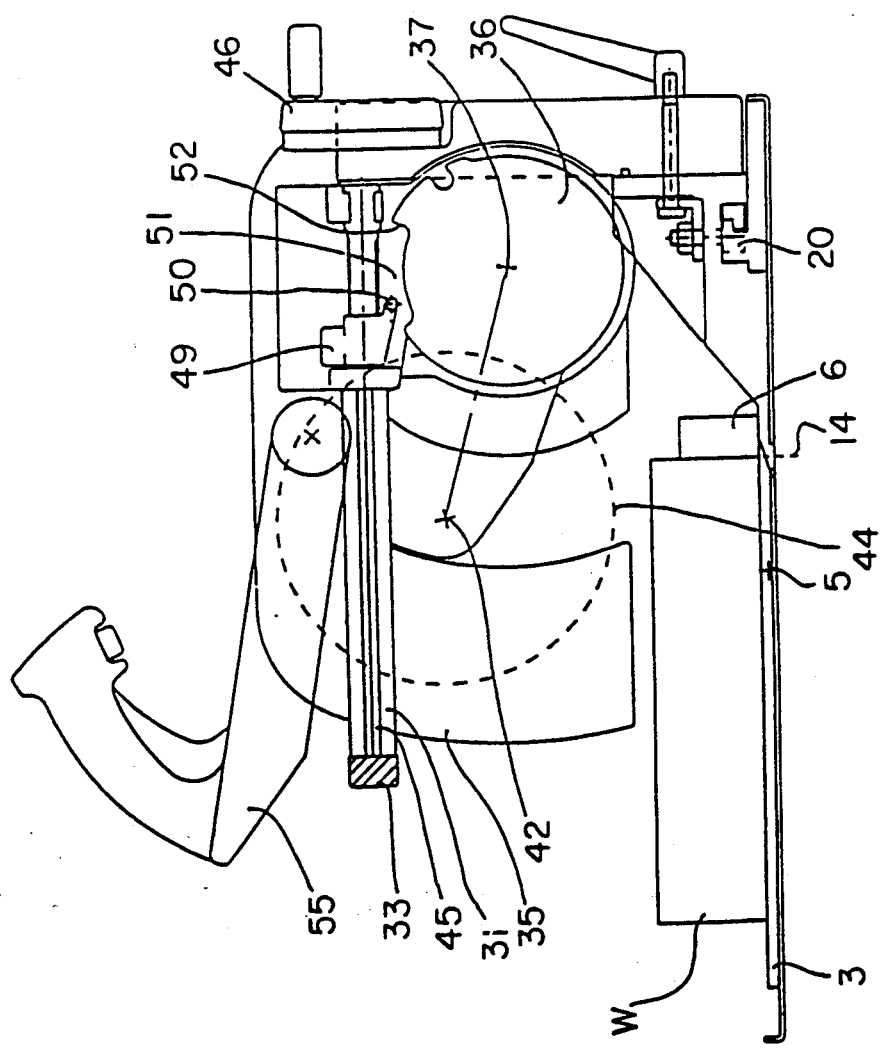

CIRCULAR SAW ARRANGEMENT

FIELD OF THE INVENTION

The invention relates to a circular saw arrangement comprising a frame at which a table plate is mounted pivotable between a first position in which its first side faces upwardly and a second position in which its second side faces upwardly wherein the table plate is nonmovably connectable with the frame both in its first and in its second position, further comprising a support element mounted to the table plate rotatably about a rotation axis extending vertically with respect to the main plane of the table plate which support element carries a saw unit containing a powered saw blade wherein the saw blade in the first position of the table plate can be moved downwardly from a raised position to cut a workpiece and can be moved from its centre position to a mitre position and the saw unit in the second position of the table plate is located beneath such table plate and a section of the saw blade extends through a through slot in the support element and upwardly beyond the second side of the table plate.

BACKGROUND OF THE INVENTION

With a known circular saw arrangement of this type (German Patent No. 1 628 992), the support element has the shape of a round table which is inserted into an opening in the table plate and is held rotatable in this opening. The saw unit is mounted at an edge area of the round table so that in the first position of the table plate it can be pivoted about a horizontal axis. In this way chop-cuts can be carried out with the saw blade usually powered by an electric motor, the saw unit being lowered by the user from a position in which the saw blade is located at a distance above the round table, and the saw blade thus being guided though the workpiece to be cut. So that the workpiece can be completely separated, a through slot is provided in the round table, through which slot the lower section of the saw blade extends in the lowered position, so that in this way the workpiece resting on the first side of the round plate and the associated surface of the round table can be completely separated.

To set mitre cuts, the round table can be rotated about its rotation axis, the saw unit mounted to it being correspondingly rotated. The saw blade is thus moved into the desired mitre position with regard to the workpiece-positioning face of a fence arrangement, which for such a type of chop-cut operation is usually mounted at the first side of the table plate.

When the table plate located in its first position is released from its connection with the frame, rotated through 180° into its second position and once more securely connected to the frame, the saw unit can be pivoted into a position in which the saw blade extends from below through the through slot over the upper surface of the second side of the table plate. The saw unit can be locked in this sawing position with regard to the table plate and additionally, usually in the plane of the saw blade, a riving knife secured and a protective cover affixed, so that the circular saw arrangement can then can be used like a type of circular saw bench.

One problem with the known circular saw arrangement is that in the first position of the table plate the attainable cutting width is essentially limited by the dimensions of the round table containing the through slot for the saw blade which is to be lowered. To achieve a larger cutting width it would be possible per se to enlarge the diameter of the round table and then to also use a saw blade with a larger diameter. However, this leads to an enlargement of the dimensions of the circular saw arrangement, because, inter alia, the table plate bearing the round table must then likewise be enlarged in order to provide sufficient stability to mount the round table carrying the saw unit.

To at least partially avoid this limitation of the cutting width with the known circular saw arrangement, slots have also already been provided in the table plate, of which the one in the centre position of the saw blade forms a continuation of the through slot provided in the round table, whilst others form a corresponding continuation of this through slot for selected mitre positions, say mitre positions of 45°. In this way it was then possible, at least in the centre position and the marked mitre positions, to cut though wider workpieces by lowering the saw blade more than in the other mitre positions.

However, this structure which enlarges the cutting width in exceptional cases, leads, on the one hand, to the weakening of the table plate because of the slots in it, so that said table plate must be constructed with greater strength or to larger dimensions. On the other hand, design features must be provided by means of which, in mitre positions in which no elongation in the table plate is available for the through slot, the saw unit can certainly be prevented from being lowered so far that the saw blade engages with the edge area of the table plate. The design outlay needed to achieve somewhat enlarged cutting widths in a few selected positions of the saw blade is therefore considerable. Moreover, the cutting width always remained limited by the dimensions of the saw blade.

SUMMARY OF THE INVENTION

It is the object of the invention to create a circular saw arrangement with a table plate pivotable between a first position and a second position, said arrangement, with a table plate of relatively smaller dimension, permitting work to be carried out with a large cutting width in the first position of the table plate both in the centre position and in all mitre positions of the saw blade.

To achieve this object, a circular saw arrangement of the initially mentioned type is designed according to the invention in such a way that the support element is provided at the first side of the table plate and extends across a part thereof, that the saw blade extends into the through slot in a lowered cutting position and is located above the part of the table plate covered by said support element, and is at least in this position movable in the direction of the longitudinal direction of the through slot, and that an opening is provided in the table plate which opening in the centre position of the saw blade is overlaid by at least a portion of the through slot and through which opening and the through slot the section of the saw blade extends in the second position of the table plate.

With the circular saw arrangement according to the invention, in the first position of the table plate the cutting movement of the saw blade is not limited to chop-cuts, but the saw blade can also be moved in the direction of the longitudinal direction of the through slot, i.e. combined with chop-cuts the circular saw arrangement according to the invention can work as a pull or rip saw; thus, for example, after the saw blade has been lowered as per a chop-cut, it can be moved in this lowered position through the not yet completely separated workpiece as per a pull cut. Compared to a pure chop-cut saw function, this results in clearly enlarged cutting widths, without it being necessary to enlarge the diameter of the saw blade.

To achieve this enlargement of the cutting width without enlarging the dimensions of the table plate, the support element carrying the saw unit is provided at the first side of the table plate, i.e. lies at least with parts in the first position of the table plate above this table plate. The saw blade which normally, to separate the workpiece, must be lowered at least until it extends with its lower peripheral area into the through slot of the support element, is located with said lower peripheral area in a lowered cutting position, defined, for example, by a stop arrangement, above the table plate. The result of this is that the saw blade can be lowered as per a chop-cut until it cuts through the workpiece and then, to further separate the workpiece, can be moved in the longitudinal direction of the through slot until the workpiece is completely separated. During this the saw blade can move over portions of the table plate located beneath the through slot, but neither in its centre position nor in any mitre position does it come into contact with the table plate. The combined chop-cuts and pull or rip cuts can thus be carried out without enlargement of the dimensions of the table plate, which, in the case of the known circular saw arrangement with which only chop-cuts are possible, was the decisive boundary for the achievable cutting width.

To also be able to use the circular saw arrangement according to the invention as a bench saw, with which in the second position of the table plate a section of the saw blade extends upwardly beyond the second side, the table plate of the circular saw arrangement according to the invention has an opening somewhat in the shape of an elongated slot which in the centre position of the saw blade cooperates with the through slot so that the saw blade in the second position of the table plate moves through the opening and through the through slot and can thus be brought into the sawing position for the bench-saw operation.

Whereas, in the case of the known circular saw arrangement, the round table forming the support element must be so placed in the table plate so that, when carrying out chop-cuts, the through slot provided in the round table allows the saw blade to pass through, i.e. on the underside of the round table the through slot must not be covered by areas of the table plate, in the case of the circular saw arrangement according to the invention an area of the table plate can be and is present beneath the through slot in most positions of the support element. The table plate in the case of the circular saw arrangement according to the invention does not in fact need a receiver opening having essentially the dimensions of the support element mounted rotatably to it, so that there is greater strength and stability of the table plate than with the known circular saw arrangement. As a result of this, the table plate in the case of the circular saw arrangement according to the invention, and thus also the total circular saw arrangement, can be given smaller dimensions as was the case with the known circular saw arrangement which, limited to pure chop-cuts, provides for a clearly smaller cutting width.

It is already also known (European Patent No. 0 242 733) to design a circular saw arrangement for carrying out not only chop-cuts but also pull cuts so that a support element mounted rotatably in a table-like frame portion and comprising a round table with an arm attached thereto and in which an entry slot for the saw blade is provided, is used to lower the saw blade, which is part of a saw unit mounted to the support portion, to carry out a chop-cut until the lower area of the saw blade engages with the entry slot, and then to move the saw blade in the longitudinal direction of the entry slot to completely separate the workpiece by a pull cut. By rotating the support portion with regard to the bench-like frame, the desired mitre position can also be set without limiting the cutting width. However, this known circular saw arrangement does not permit a conversion into a position as circular bench saw, i.e. an arrangement wherein a section of the saw blade projects upwardly over a working surface. Rather, this known circular saw arrangement completely lacks a table plate comparable to that of the circular saw arrangement according to the invention, pivotable between two positions, which in its second position forms with its second side the working surface for the bench saw and through which in this second position a section of the saw blade must extend upwardly.

In a preferred embodiment of the circular saw arrangement according to the invention, at the first side of the table plate a fence arrangement can be provided which forms a workpiece-positioning face for positioning the workpiece to be cut. In the area near to the saw blade, this fence arrangement can have a recess to allow a portion of the saw blade to pass through, so that in the lowered cutting position the saw blade projects with its area lying in the plane of the workpiece-positioning face into the through slot, but with the area adjacent to said saw blade area; extends through the recess of the fence arrangement.

The rotation axis of the support element can be located in the area of the fence arrangement and preferably in the plane of the workpiece-positioning face, so that when the saw blade is moved into different mitre positions, the course of the cutting operation in the plane of the workpiece-positioning face does not change.

The saw unit can be connected to the support element at the side opposite the workpiece-positioning face of the fence arrangement, and the distance between the attachment area for the saw unit on the support element and the rotation axis of the support element is preferably smaller than the outer end of the through slot in the support element. Thus, the dimensions of the support element at the side of the rotation axis facing the through slot can be considerably smaller than in the area of the through slot.

The table plate of the circular saw arrangement according to the invention can at its first side have a recess accommodating at least the section of the support element displaying the through slot of the support element, so that in this area the table plate has a lesser material thickness than in the remaining area. In this way not only is the weight of the total structure reduced, but moreover, the total thickness of the area to be penetrated by the saw blade in the second position of the table plate, comprising support element and table plate, is reduced, so that the saw blade can project higher above the second side of the table plate than would be the case with a thicker table plate.

The depth of the recess in the table plate preferably equals the height of the section of the support element received, so that the areas of the table plate adjoining the recess and the upper side of the support element lie on the same plane and thus all contribute to support a workpiece to be worked.

The side-wall portions of the recess can act as stops to limit the displacement of the support element from out of the centre position.

A further saving of material and weight can be achieved by providing the through slot in an elongated section of the support element, which runs in its longitudinal extent in the direction of the through slot, so that the support element is relatively narrow and elongated in the area of the through slot.

To also be able to carry out so-called inclined-mitre or inclined cuts, i.e. cuts with the saw blade in an inclined position with respect to the main plane of the table plate, with the circular saw arrangement according to the invention the saw blade can be pivotable about a pivot axis to change the inclination of the saw blade with respect to the main plane of the table plate in the first and in the second position thereof, said pivot axis running parallel to the longitudinal direction of said through slot, the central axis of the pivot axis preferably lying in the longitudinal centre plane of the through slot.

When the centre axis of the pivot is located at half-height between the side of the section of the support element comprising the through slot facing away from the table plate and the second side of the table plate located opposite to said section, the saw blade is displaced not only in the first but also in the second position of the table in the same way with regard to the through slot in the support element and the opening in the table plate, so that the width of the through slot and the width of the opening can be minimal.

As previously mentioned, the saw blade in the first position of the table plate may be brought into a lowered cutting position, in which it extends into the through slot but lies with its lower periphery above the table plate, to thus achieve a combined chop-cut and pull- or rip-cut function without the cutting width being limited or impaired by the presence of the table plate. However, operating instances can arise when the user may wish to separate workpieces of relatively smaller width and possibly quickly carry out a large number of chop-cuts, without needing the pull- or rip-cut function. To carry out such separating cuts, the saw blade can, in at least its centre position, be lowerable beyond the lowered cutting position, say by correspondingly adjusting the stop arrangement, so that the saw blade can be guided through the through slot and also through at least a portion of the opening in the table plate, i.e. the circular saw arrangement then works as the initially described known circular saw arrangement, as a chop-cut saw.

Of course, it is possible with the circular saw arrangement according to the invention to provide such a pure chop-cut function not only in the centre position, but also in selected mitre positions, say 45° positions, by providing additional openings or slots in the table plate at the corresponding mitre positions to allow the saw blade to pass through.

Other objects, features and advantages of the present invention will become more fully apparent from the following detailed description of the preferred embodiment, the appended claims and the accompanying drawings.

BRIEF DESCRIPTION OF THE DRAWINGS

In the accompanying drawings:

FIG. 14 shows, in a highly diagrammatic partial representation the saw unit with saw blade located in elevated position in its starting position on the guide means.

DETAILED DESCRIPTION OF THE PREFERRED EMBODIMENT

Figure 1:
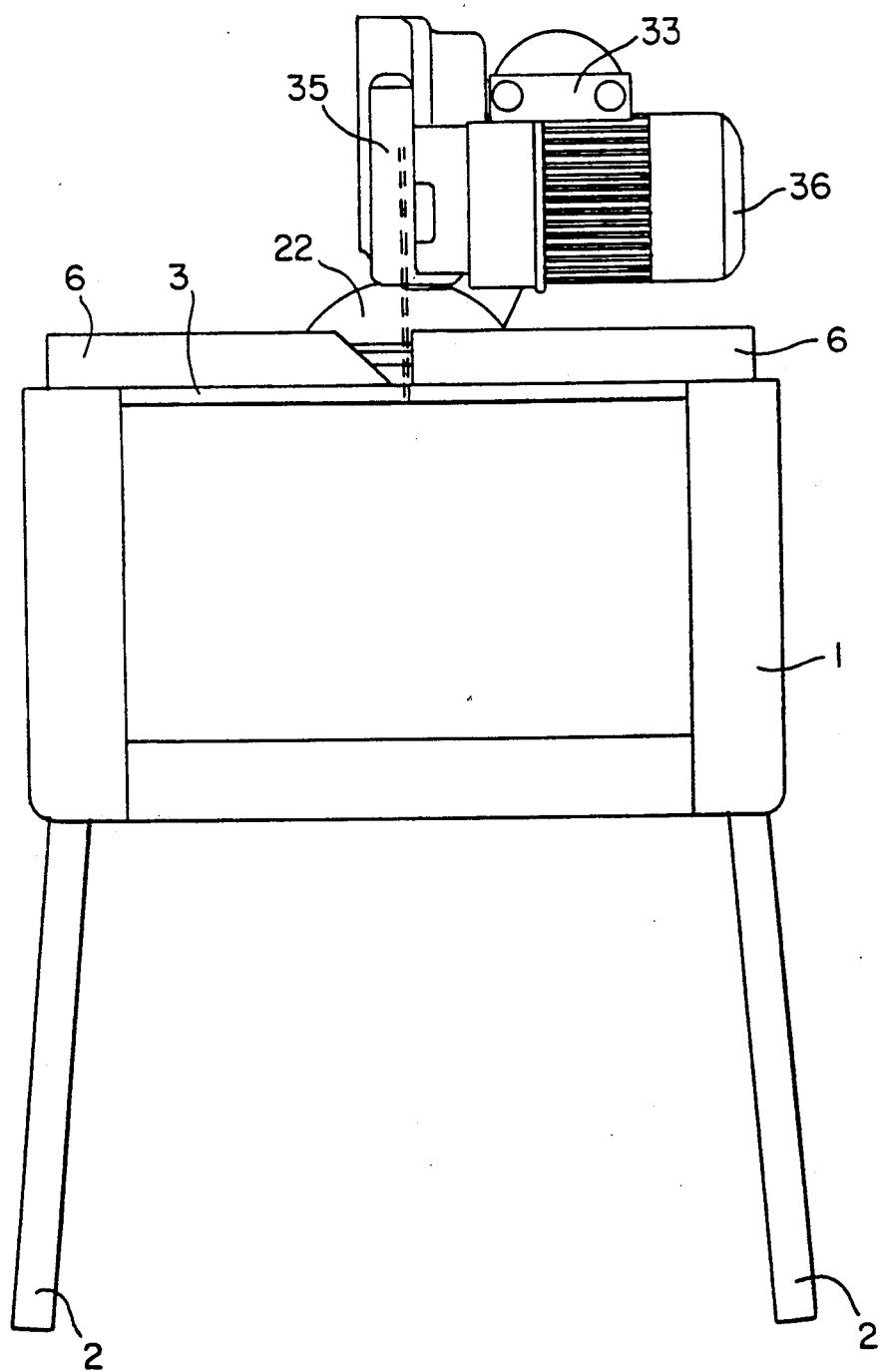
FIG. 1 shows a front view of an embodiment of a circular saw arrangement with the table plate located in the first position.

It should be mentioned that, for ease of understanding, the figures for both embodiments do not contain all section patterns and hatching lines which normally are to be provided, and that views have been shown partly in diagrammatic form.

The circular saw arrangement represented in FIGS. 1 to 22 has a frame 1 which has four legs 2, and into the top end of which a table plate 3 is inserted rotatable about an axis 5. The table plate 3 is defined in its position relative to the frame 1 in the position as per FIGS. 1 to 5, in which its first side faces upwardly, by means of fixing devices, e.g. the socket pins 4 diagrammatically indicated in FIGS. 2 and 20, which extend through the frame 1 and into the table plate 3.

Figure 2:
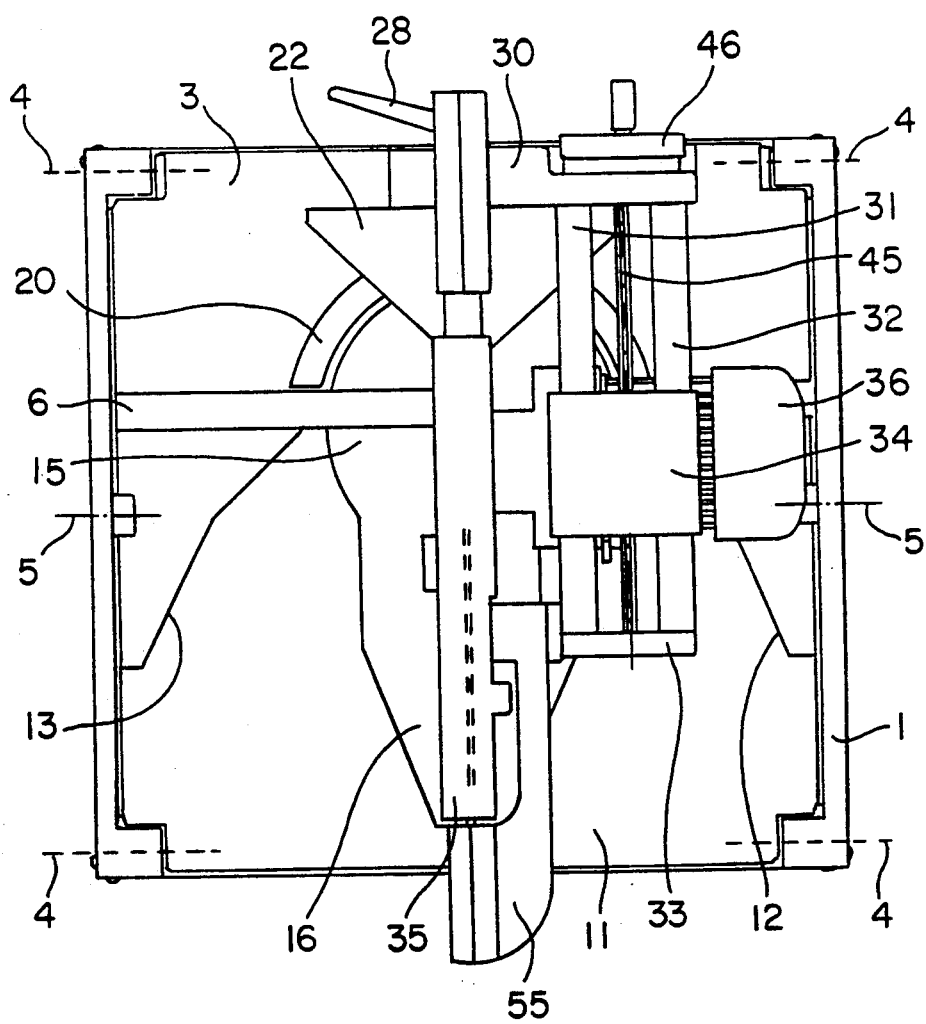
FIG. 2 shows a plan view of the circular saw arrangement according to FIG. 1.

As FIG. 2 in particular shows, the table plate 3 is essentially rectangular in shape and has recesses at its corners, into which areas of the frame 1 extend, through which pins 4 are guided. On the first, i.e. in FIGS. 1 to 17 on the upper side of the table plate 3 a fence 6 is mounted to support a workpiece W to be worked, which fence extends at a distance from the rotation axis 5 of the table plate 3 and parallel to the latter. In the centre area the fence 6 has a recess 7 which is limited at one side by an inclined edge 8 (FIG. 1).

On the first side of table plate 3, a support element 15 is mounted rotatable about a rotation axis 14 (FIGS. 6 and 11) lying perpendicular to the main plane of the table plate, said support element being in the form of a plate and overlaying areas of the first side of the table plate 3. The rotation axis 14 lies in the centre of the recess 7 of the fence 6 and in the plane of the stop face for the workpiece W formed by the fence 5. A roughly circular part of the support element 15 is arranged about this rotation axis 14, an elongate section 16 projecting from said circular part. In the elongate section 16, a through-passage slot 17 extending in the longitudinal direction of this section is present reaching directly to the rotation axis 14 and is open at its opposite outer end.

To receive the plate-like support carrier element 15, a recess 11 is formed on the first side of the table plate 3, so that the outer edge of the area of the support element 15 facing away from the elongate section 16 of the support element 15 is relatively closely surrounded by the delimitation wall of the recess 11, whilst, at the side of the fence 6 facing the elongate section 16, the recess extends towards the side edges of the table plate 3 which run perpendicular to the rotation axis 5. The thus-formed lateral delimitation walls 12 and 13 of the recess 11 terminate at a distance from the edge of the table plate 3 running parallel to the fence 6.

Figure 6:
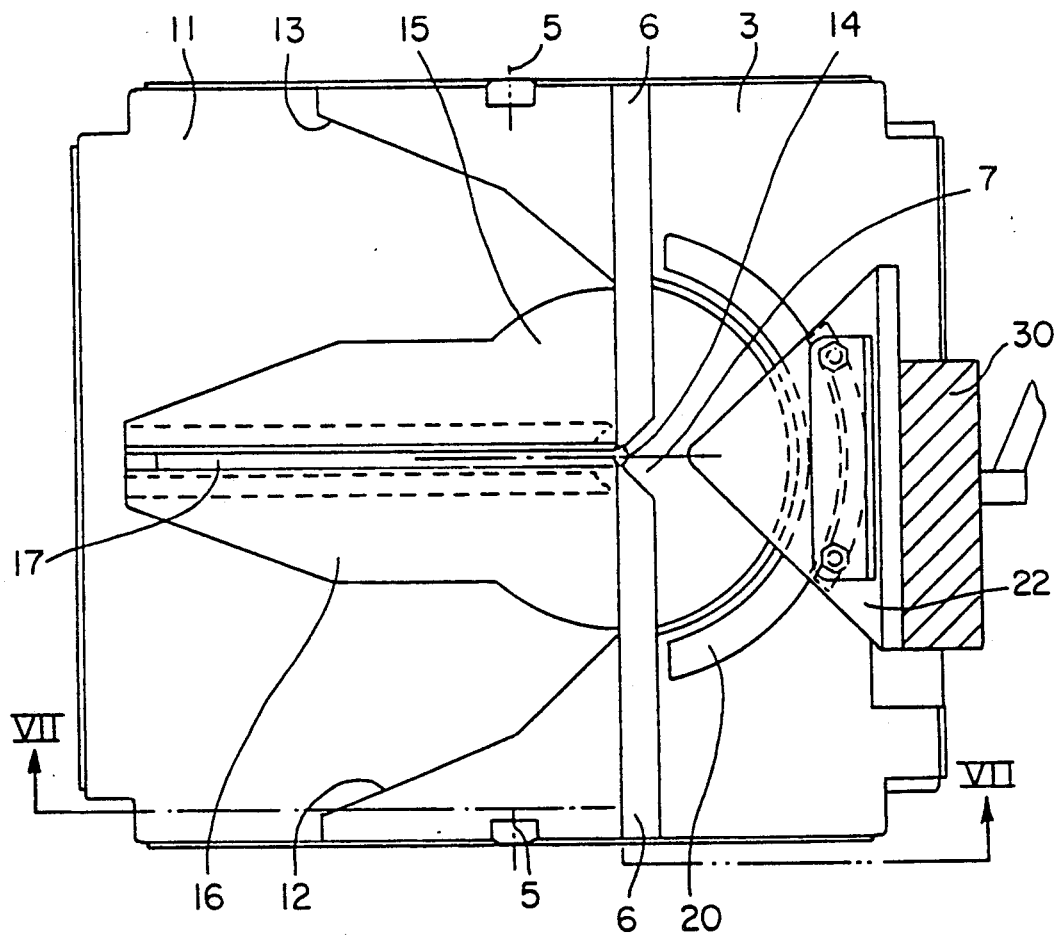
FIG. 6 shows a plan view of the circular saw arrangement as per FIGS. 1 to 5, the saw unit and the guide means for this as well as the frame being omitted and the carrier element being located in the centre position.
Figure 7:
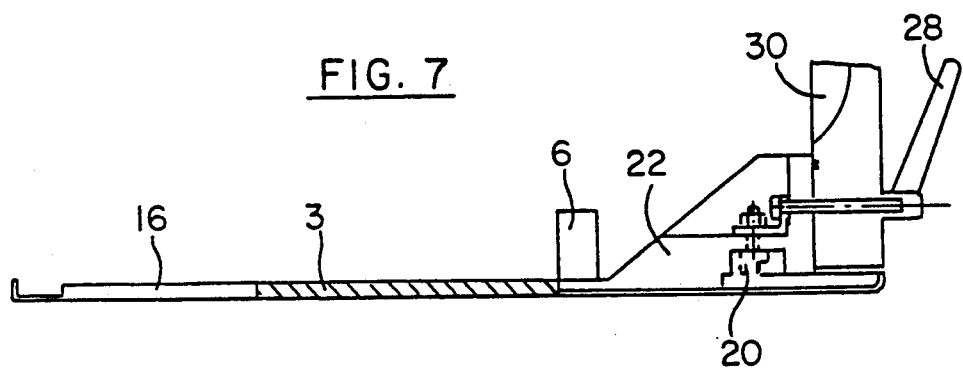
FIG. 7 shows partly a view and partly a section along the line VII—VII from FIG. 6.
Figure 8:
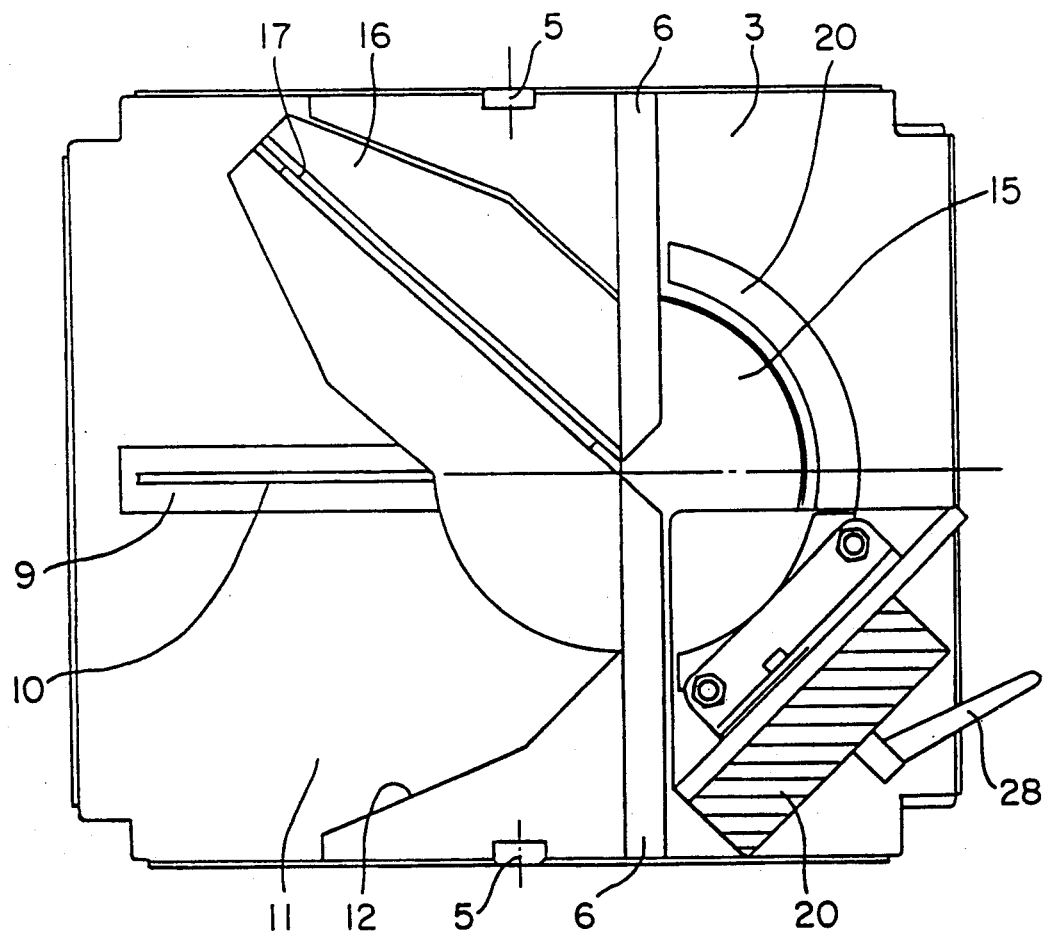
FIG. 8 shows the circular saw arrangement in a representation corresponding to FIG. 6 with the carrier element rotated out of its centre position.

As is to be particularly seen from FIG. 8, the side walls 12 and 13 of the recess 11 of the table plate 3 are formed corresponding to the side walls of the elongate section 16 of the support element 15 and form stops, by means of which the rotation of the support element 15 about the rotation axis 14 out of the centre position as per FIG. 6 is limited. The upper surfaces of the non-recessed parts of the table plate 3 on the left side of the fence 6 in FIGS. 6 and 8 lie in the same plane as the upper surface of the support element 15 so that the table plate 3 and the support element 15 form supporting sections for a workpiece W, which is laid against the workpiece positioning face of the fence 6 for treatment.

As is to be particularly seen from FIG. 8, a slot-like opening 10 is located in the area of the recess 11 of the table plate 3, designed as an insert unit 9 fitted into the table plate 3 and having a longitudinal axis extending through the rotation axis 14 and perpendicular to the workpiece positioning face of the fence 6. Thus, in the centre position of the support element 15 according to FIG. 6, the slot-like opening 10 is covered by the through-passage slot 17 in the support element 15 or the through-passage slot 17 and the slot-like opening 10 are arranged flush in the centre position.

As previously mentioned, the support element 15 is plate-like and has a level lower and a level upper face, the level lower face resting on the level upper face of the table plate 3 in the area of the recess 11. The thickness of the support element 15 is chosen to be as small as possible whilst being just strong enough. The thickness of the table plate 3 in the area of the slot-like opening 10 should likewise be as small as possible and this thickness preferably equals the thickness of the support element 15 in the section containing the through-passage slot 17. The reason for this will be explained later.

Figure 9:
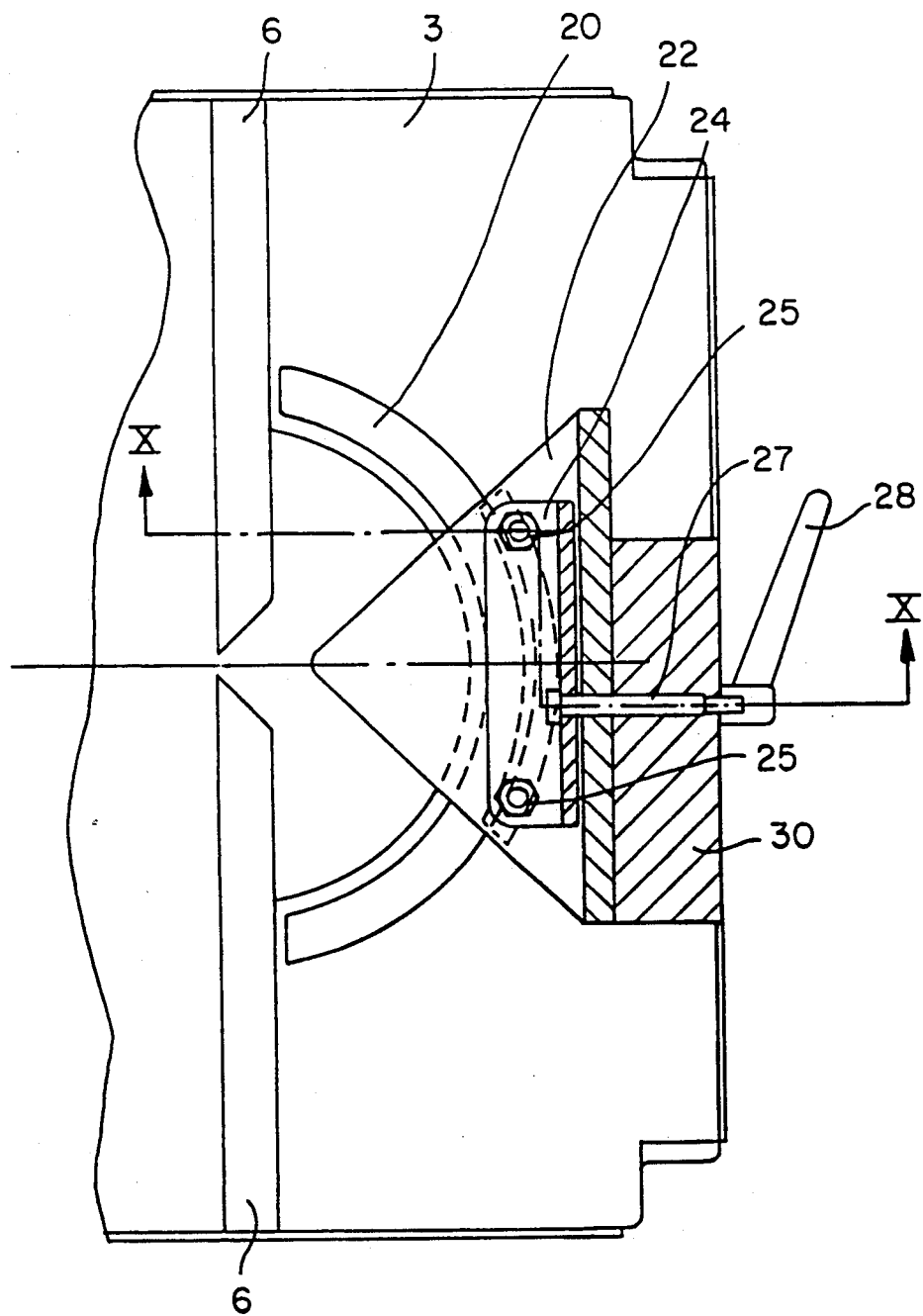
FIG. 9 shows a partial section along the line IX—IX from FIG. 10.

Secured on the support element 15, say be being welded on, in the area opposite the elongate section 16, at a clearly lesser distance from the rotation axis 14 than the outer end of the through-passage slot 17, is a connection part 22 which on its lower side has a curved duct 23 indicated in FIG. 9 with dashes, into which a curved guide rib section 20 forming part of the table plate 3 extends. Inserted through two bores provided in the connection part 22 and extending from above into the duct 23, are screw bolts 25 which have a lower, angled section 26 extending behind a projecting area 21 of the guide-rib section 20. The upper ends of the screw bolts 25 extend through one leg of an angular clamp 24 and are connected to this by means of nuts. The other leg of the angular clamp 24 lies adjacent to a perpendicular wall of the connection part 22, and extending through the latter and said wall is a clamping bolt 27 which lies with its head against the surface of the leg of the angular clamp 24 facing away from the perpendicular wall of the connection part 22. The clamping bolt 27 extends on the side of the perpendicular wall of the connection part 22 facing away from the angular clamp 24, through a holding part 30 directed perpendicularly upwards. It has a threaded section extending beyond this holding part and engaging by screwing with a clamping lever 28. On the side of the holding part 30 facing the perpendicular wall of the connection part 22, a circular arc-shaped guide groove is formed, indicated in FIG. 11 by dashes and with the centre of its circle lying on the rotation axis 56, likewise indicated in FIG. 11. A guide projection 29, formed at the perpendicular wall of the connection part 22, projects into this guide groove; during sawing with the saw blade aligned perpendicular to the main plane of the table 3, said guide projection lies at the right-hand end, in FIG. 11, of the guide groove.

Figure 10:
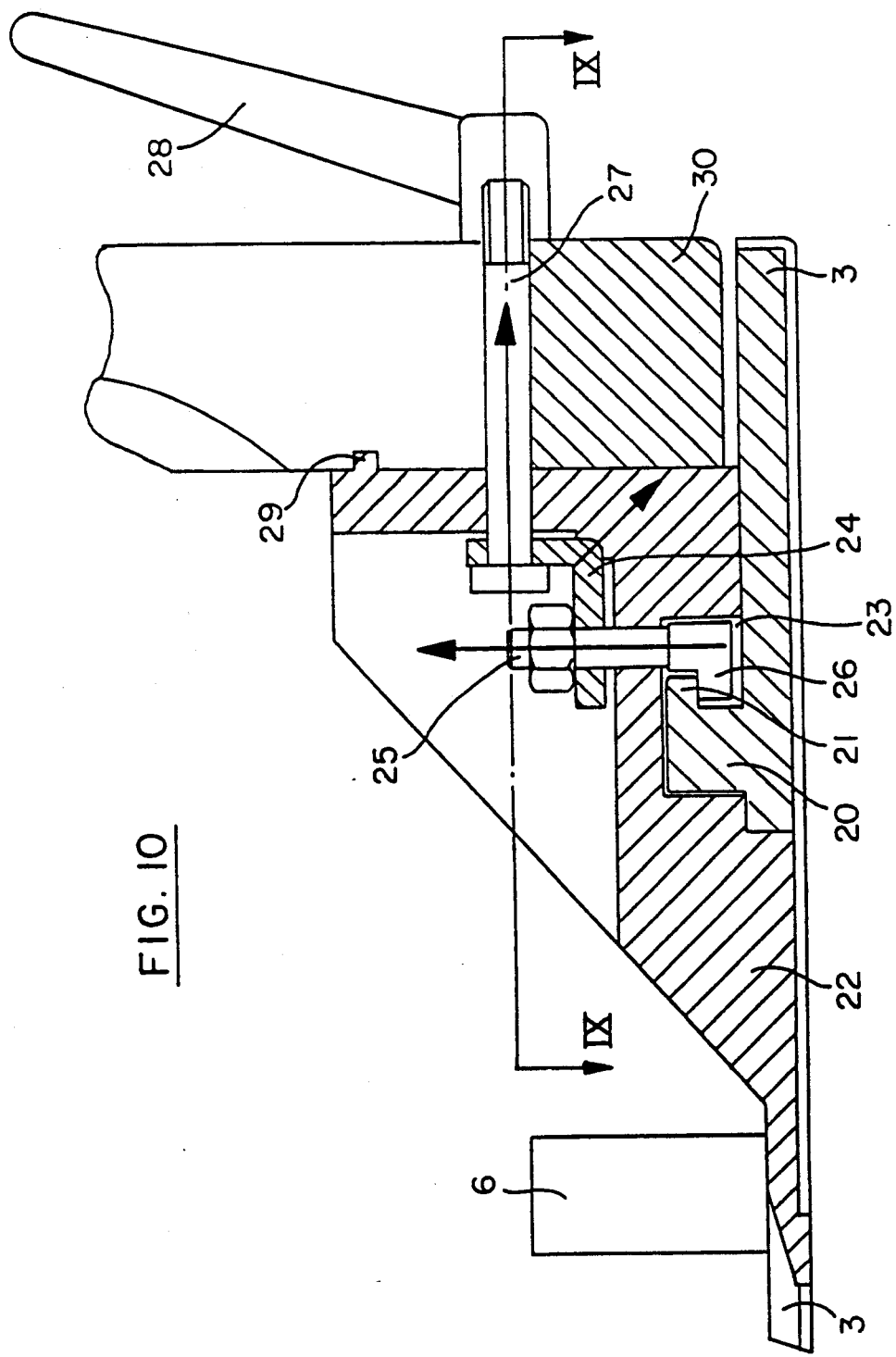
FIG. 10 shows a partial section along the line X—X from FIG. 9.

When the clamping lever 28 is released, the areal engagement between the holding part 30 and the perpendicular wall of the connection part 22, and the engagement between the angled section 26 of the screw bolt 25 and the projecting area 21 of the guide-rib section 20, loosens. In this released position, the holding part 30 and the connection part 22, and thus the support element 15 securely connected to the connection part 22, can therefore be moved about the rotation axis 14 into the desired position, say from the centre position according to FIG. 6 into the position according to FIG. 8 or any intermediate position. If, in the position reached, the clamping lever 28 is once more rotated so that the clamping bolt 27 once more applies a load to the angular clamp 24 supporting itself with the cutting area of the legs in a rise in the connection part 22, the leg of the angular clamp 24 engaging with the clamping bolt 27, perpendicular in FIG. 10, is moved in the direction of the perpendicular wall of the connection part 22 and so tilted to the extent of the rise at the connection part 22. Thus, the other leg of the angular clamp 24 raises the screw bolt 25 in the direction of the arrow by abutment against its nut and clamps the angled section 26 of the screw bolt 25 by abutment against the projecting area 21 of the guide-rib section 20 forming part of the table plate 3. In this way the position of the holding part 30 and support element 15 relative to the first side of the table plate 3 is defined.

In the previously mentioned, released state of the clamping lever 28 it is also possible to rotate the holding part 30 relative to the connection part 22 about the horizontal axis 56 (FIG. 11), the guide projection 29 then being moved in the curved guide groove of the holding part 30. Also, in such a rotated position of the holding part 30 vis-a-vis the connection part 22 and thus of the table plate 3, the holding part 30 can be defined by pulling the clamping lever 28.

At the upper end region of the holding part 30, a guide means is present in the shape of two guide rods 31, 32, running at a distance from, and parallel to, each other, having a circular cross-section and connected at their free end by a transverse element 33. The guide rods 31 and 32 run parallel to the main plane of the table plate 3 and thus also parallel to the support surfaces, formed by the first side of the table plate 3 in cooperation with the support element 15, for a workpiece W to be treated. The two guide rods 31 and 32 extend, parallel to the longitudinal direction of the through-passage slot 17, in the support element 15 and project over the fence 6 in the direction of the free end on the elongate section 16 of the support element 15.

Between the two guide rods 31 and 32, and running parallel to them, a spindle 45 is arranged which has a hexagonal cross-section. The spindle 45 is mounted with its outer end rotatable in the transverse element 33 and extends with its inner end through the holding part 30, a hand wheel 46 being mounted on its inner end section projecting from the holding part 30.

On the guide means comprising guide rods 31 and 32 a slide 34 is arranged, movable in the longitudinal direction of the guide means, on which a holding ring 38 (FIG. 13) is mounted. This holding ring coaxially encompasses an electric motor 36 so that the electric motor 36 is rotatable in the holding ring 38 about the longitudinal axis 37 of its armature shaft and thus relative to the slide 34. On one end of the armature shaft of the electric motor 36 sits, non-rotatably, a toothed wheel, over which an endless toothed belt 41 is guided. The housing section of the electric motor 36, which accommodates the toothed wheel 40, is extended perpendicular to the axis 37 of the armature shaft of the electric motor 36 and accommodates at its outer end a shaft, rotatable about a rotation axis 42, to which shaft the circular saw blade 44 is non-rotatably secured and which shaft supports, non-rotatably, a toothed wheel 43 which engages with the endless toothed belt 41. Upon rotation of the armature of the electric motor 36, the toothed belt 41 is thus driven by its toothed wheel 40, and thus, via the engagement of the toothed belt 41 with the toothed wheel 43, the saw blade 44 is rotated about the axis 42.

On the slide 34 is additionally mounted a protective hood 35 which encloses and protects the upper part of the saw blade 44. Moreover, on the housing part 39 of the electric motor 36 a hand grip 55 is mounted in the way recognizable in FIGS. 14 to 17.

Figure 3:
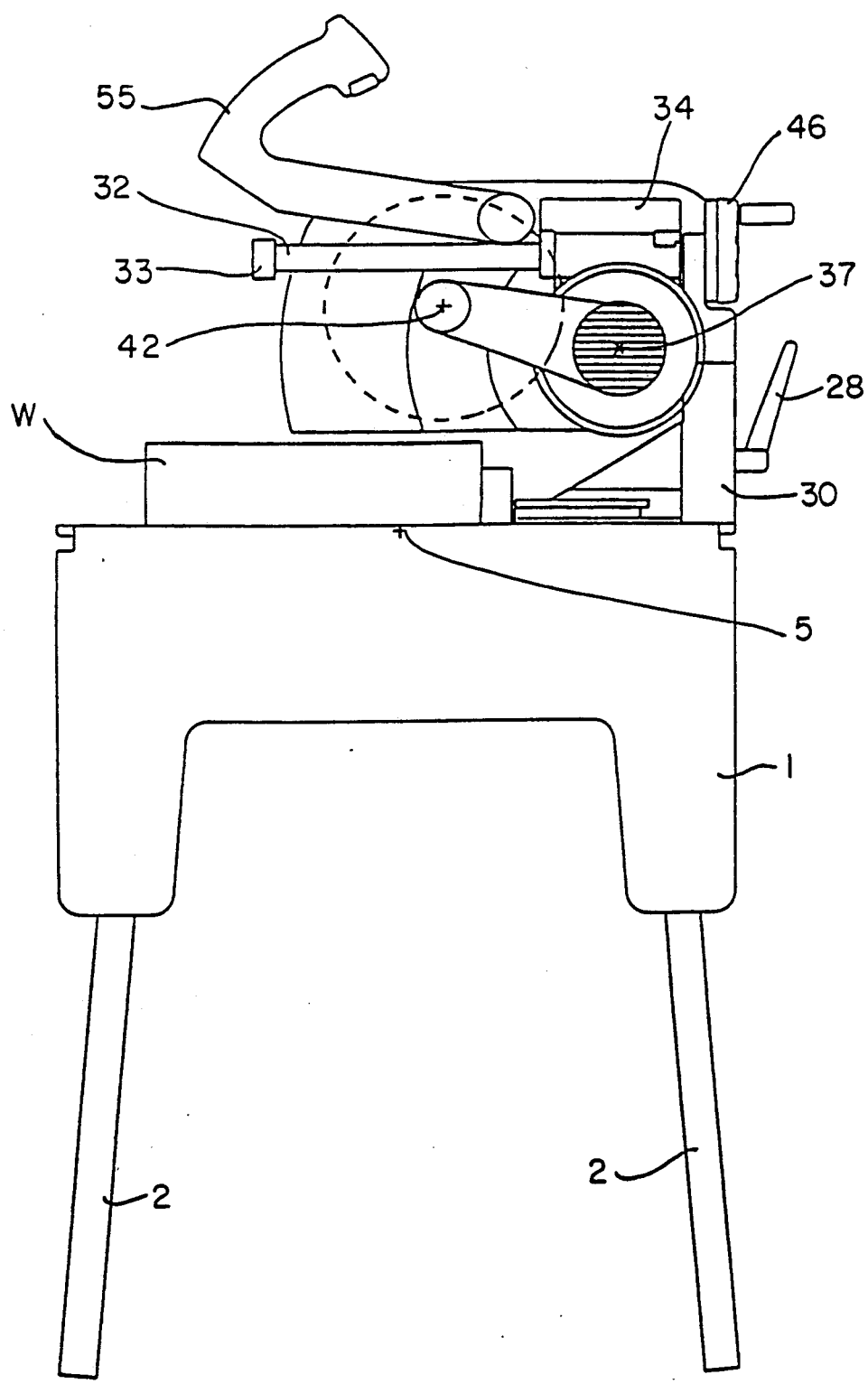
FIG. 3 shows a side view of the circular saw arrangement according to FIGS. 1 and 2, the saw blade being located in the elevated position.
Figure 4:
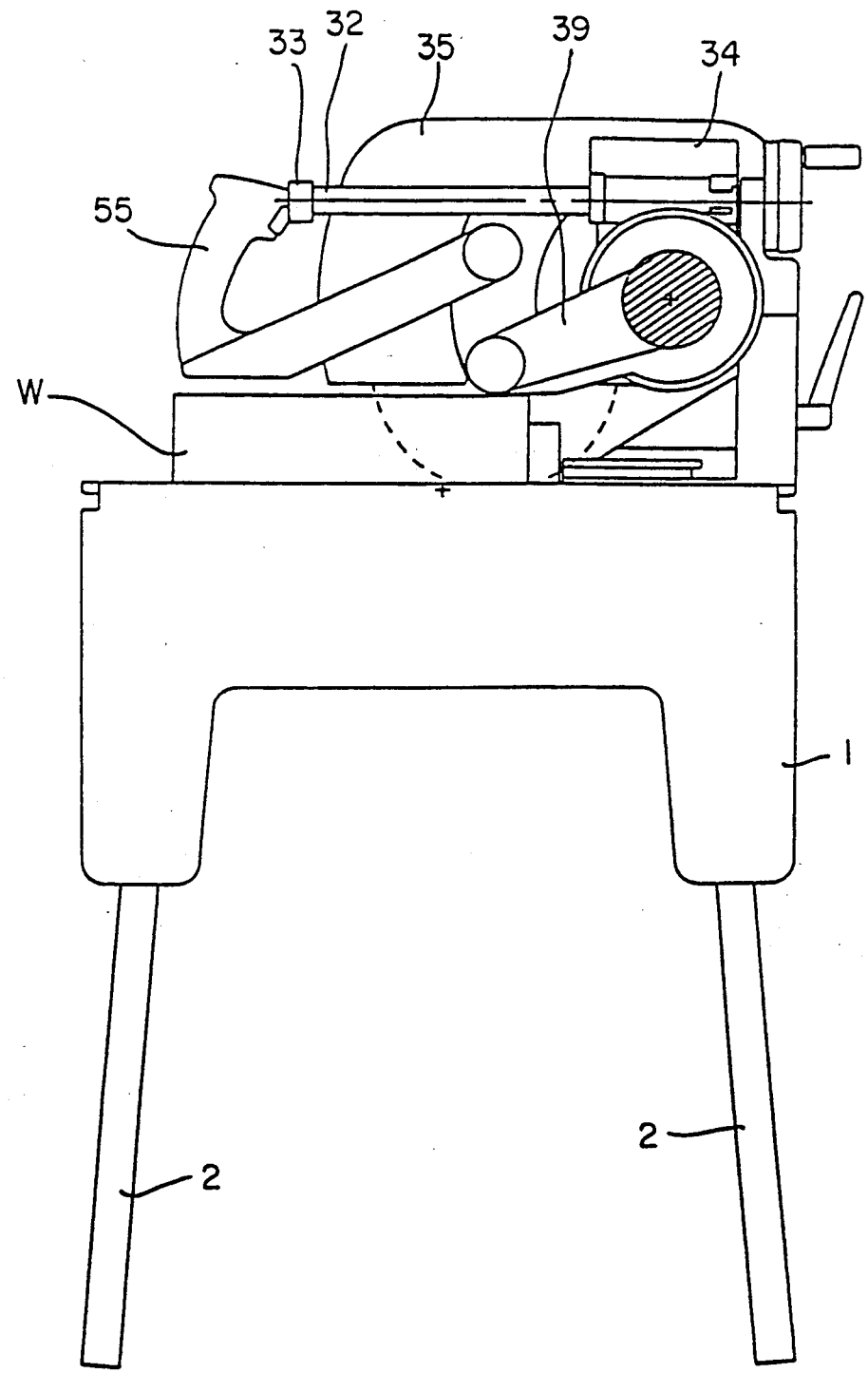
FIG. 4 shows a view as per FIG. 3 of the circular saw arrangement with the saw blade located in lowered cutting position.

By grasping the hand grip 55, the user can thus move the saw unit containing the electric motor 36 and the saw blade 44 out of the position as per FIG. 14 or FIG. 3 against the force of a spring, not shown, by moving the hand grip 55 downwards. This movement leads to a downward movement of the housing part 39 and thus to a rotational movement of the electric motor 36 about the axis 37 of its armature shaft and also to a downward movement of the saw blade 44 into the position as per FIG. 15 or FIG. 4. Thus there is no height-displacement of the electric motor 36 relative to the guide rods 31 and 32 because the latter is simply rotated within the holding ring 38 about its axis 37.

Figure 5:
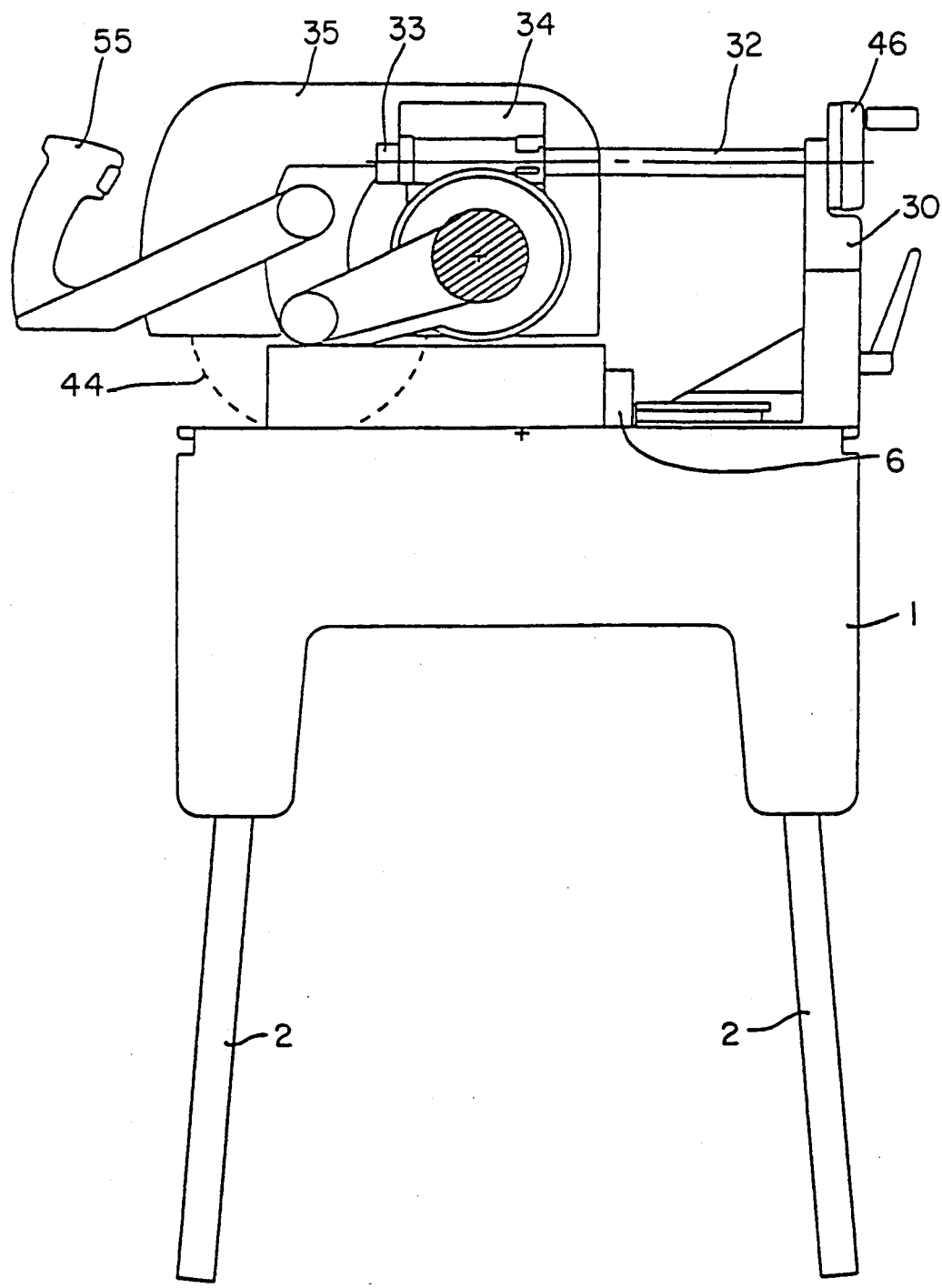
FIG. 5 shows the circular saw arrangement in a representation corresponding to FIGS. 3 and 4 with the saw blade lowered and moved in the longitudinal direction of the guide means.
Figure 15:
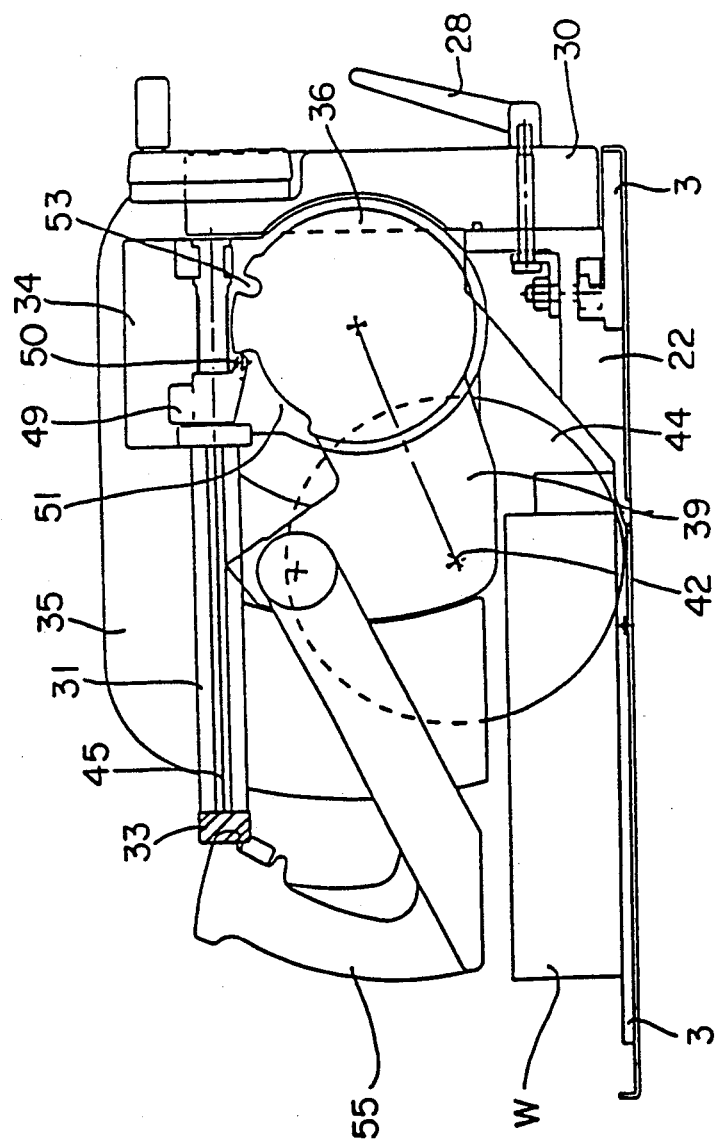
FIG. 15 shows the saw blade in a representation corresponding to FIG. 14 moved in its lowered cutting position and the saw unit located in the starting position.
Figure 16:
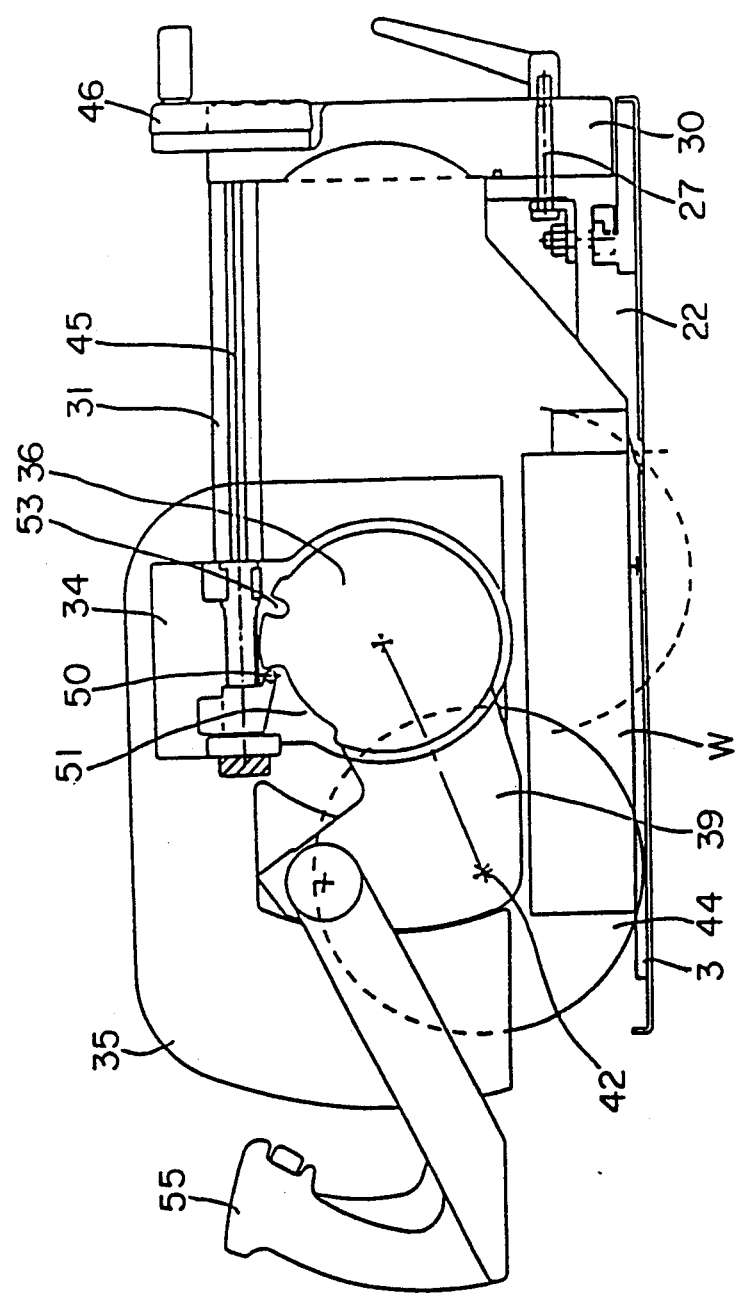
FIG. 16 shows the saw blade in a representation corresponding to FIG. 15 moved into the lowered cutting position and the saw unit moved to its maximum towards the free end of the guide means.
Figure 17:
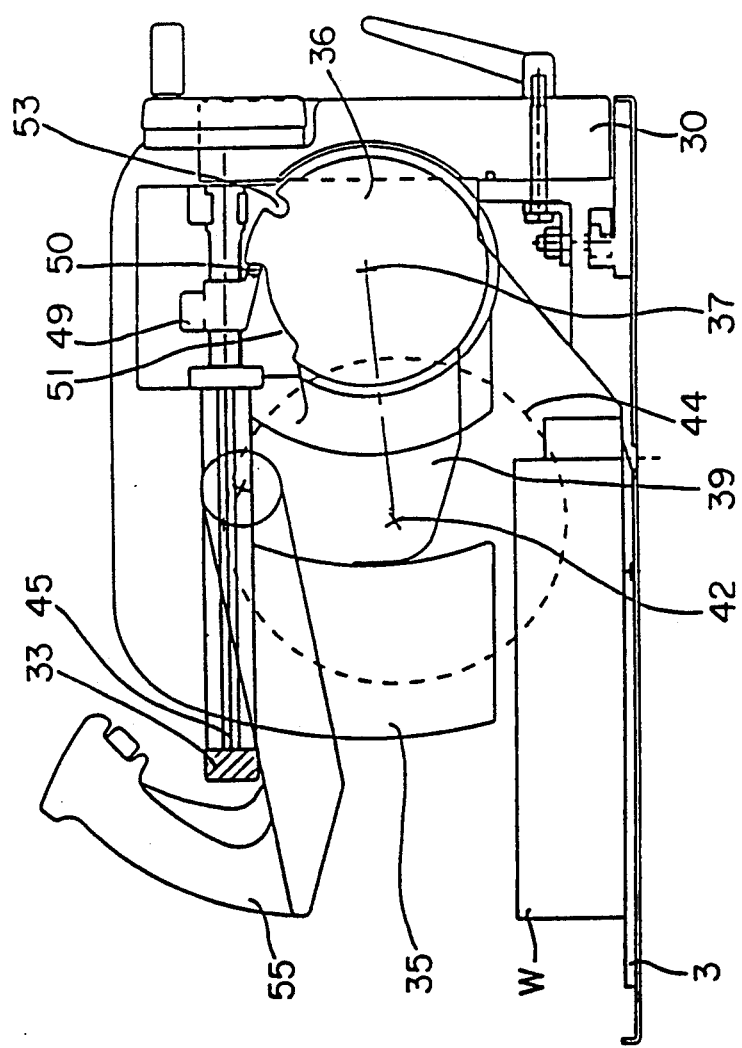
FIG. 17 shows the saw blade in a representation corresponding to FIG. 15 in a lowered position which lies above the cutting position as per FIGS. 15 and 16.

In addition, by pulling on the hand grip 55, the user can move the slide 34 against the force of a spring, not shown, out of the position as per FIG. 14 or as per FIG. 15 in the direction of the free end of the guide rods 31 and 32 until it meets the stop on the transverse element 33 (FIGS. 5 and 16).

If the support element 15 is located in the centre position as per FIG. 6, the user can carry out pure chop-cuts by performing the previously mentioned lowering of the saw blade 44 by means of pivoting about the axis 37 of the electric motor 36 and thus moving the saw blade 44 through the through-passage slot 17 in the support element 15 and the slot-like opening 10 in the area of the recess 11 of the table plate 3, in order to separate a workpiece, as the saw blade position in FIG. 16 shown by dashes indicates.

Usually, however, the circular saw arrangement represented is not used to carry out pure chop-cuts but a large cut width is to be achieved with it by combining chop-cut saw function with rip-saw function. For this, a limiting stop arrangement is present which essentially determines the position of the saw blade 44 during use.

The limiting stop arrangement contains a stop 50, which is part of a stop element 49 that engages by screwing with the outer thread 48 of an adjusting bush 47 (FIG. 27). The adjusting bush 47 is mounted axially non-movable, but rotatable in the slide 34 and sits non-rotatable and axially slidable on the spindle 45 which has a hexagonal cross-section and extends between the guide rods 31 and 32. Thus, if the spindle 45 is rotated about its longitudinal axis by the user by actuation of the hand wheel 46, the screw engagement of adjusting bush 47 rotating of itself together with the spindle 44 and of stop element 49 causes an axial displacement of the stop element 49 along the adjusting bush 47. In this way the stop element 49 can be moved for example into the position as per FIGS. 14 and 16, and in this position, as FIGS. 14 and 16 show, it can be moved together with the slide 34 along the guide rods 31, 32.

Further, in the housing wall of the electric motor 36 the limiting stop arrangement has a recess 51 (FIG. 11), which, at its right-hand end in FIGS. 14 to 16, forms a stop face 52. Further, offset clockwise in the distance from the stop face 52 in FIGS. 14 to 16, a stop recess 53 is formed whose function will be described later.

As a comparison of FIG. 14 with FIGS. 15 and 16 shows, when the saw blade 44 is in the raised position the stop 50 is in the area above the recess 51 in the motor housing and at a distance from the stop face 52. If the saw blade 44 is lowered by pressing down the hand grip 55, the electric motor 36 is rotated about its axis 37 and the stop face 52 in the housing wall of the electric motor 36 approaches the stop 50 until it comes to rest against it. In this position, in which the saw blade 44 is in the so-called cutting position (FIGS. 15 and 16), no further lowering of the saw blade 44 is possible.

As shown, in the embodiment the cutting position is determined by the furthest left position of the stop element 49, i.e. by an end position of the stop element 49. In this cutting position, the saw blade 44 extends into the through-passage slot 17 in the support element 15, but does not project over or beyond the underside of the support element 15, i.e. the saw blade 44 is always above the plane formed by the upper surface of the recess 11 of the table plate 3. Therefore, the saw blade 44 does not cut into this table plate even if the support element 15 is rotated out of the centre position as per FIG. 16 into a mitre position, say as per FIG. 8. Also in such a position, the workpiece W is initially cut into or through by means of a chop-cut by lowering the saw blade 44 from the position as per FIG. 14 into the position as per FIG. 15, in which the stop face 52 in the housing of the electric motor 36 abuts against the stop 50, so that no further lowering is possible, but the cutting position of the saw blade 44 is reached in which the lowest point of the saw blade 44 lies above the table plate 3. The user can move the saw blade 44 into the position as per FIG. 16, while maintaining this lowered position, by pulling on the hand grip 55 and through the resultant displacement movement of the slide 34 along the guide rods 31 and 32 in the form of a rip cut, in order thus to completely separate the workpiece W, the lower part of the saw blade 44 always extending into the through-passage slot 17 in the support element 15.

It should be pointed out that, to achieve a pure chop-cut saw function as indicated by the dotted-line position of the saw blade in FIG. 16, the user can pivot the stop 50, in the manner shown in the upper representation of FIG. 16, out of the area of engagement with the stop face 52, so that lowering of the saw blade 44 beyond the aforementioned cutting position is possible. However, as already mentioned, this requires, in the table plate 3 below the through-passage slot 17 in the support element 15, a through-passage opening, say the slot-shaped opening 10, through which the saw blade 44 can pass downwards if lowered beyond the cutting position.

With the represented circular saw arrangement it is also possible, instead of completely separating a workpiece W according to the function as per FIGS. 15 and 16, to make a cut or slot of defined depth in the workpiece. To this end, the user can move the stop element 49 containing the stop 50 more to the right, compared with the position as per FIGS. 14 to 16, by rotating the spindle 45, say into a position as per FIG. 17. In this way, the stop face 52 comes to rest earlier against the stop 50 upon the lowering of the saw blade 44 and the associated rotation of the electric motor 36 about the axis 37, i.e. the saw blade 44 cannot be lowered into the aforementioned cutting position, but merely into a position in which it is still above the support element 15 or above its elongate section 16, i.e. does not completely separate the workpiece W when it is lowered as far as possible and is moved in this lowered position, by displacement of the slide 34, along the guide rods 31, 32 and through the workpiece W. The depth of penetration of the saw blade 44 is naturally constant over the whole course of the rip-cut because of the parallel arrangement of the guide rods 31, 32 relative to the stop face for the workpiece W.

As already mentioned, the saw blade 44 can be brought, by rotation of the support element 15 and of the holding part 30 connected to it about rotation axis 14, into a mitre-cut position in which it is no longer aligned perpendicular to the workpiece positioning face of the fence 6. Operation with a large cut width is also possible in such a mitre-cut position since, although the saw blade 44 extends, in the lowered cutting position as per FIGS. 15 and 16, into the through-passage slot 17 of the support element 15, it is always above the table plate 3.

Figure 11:
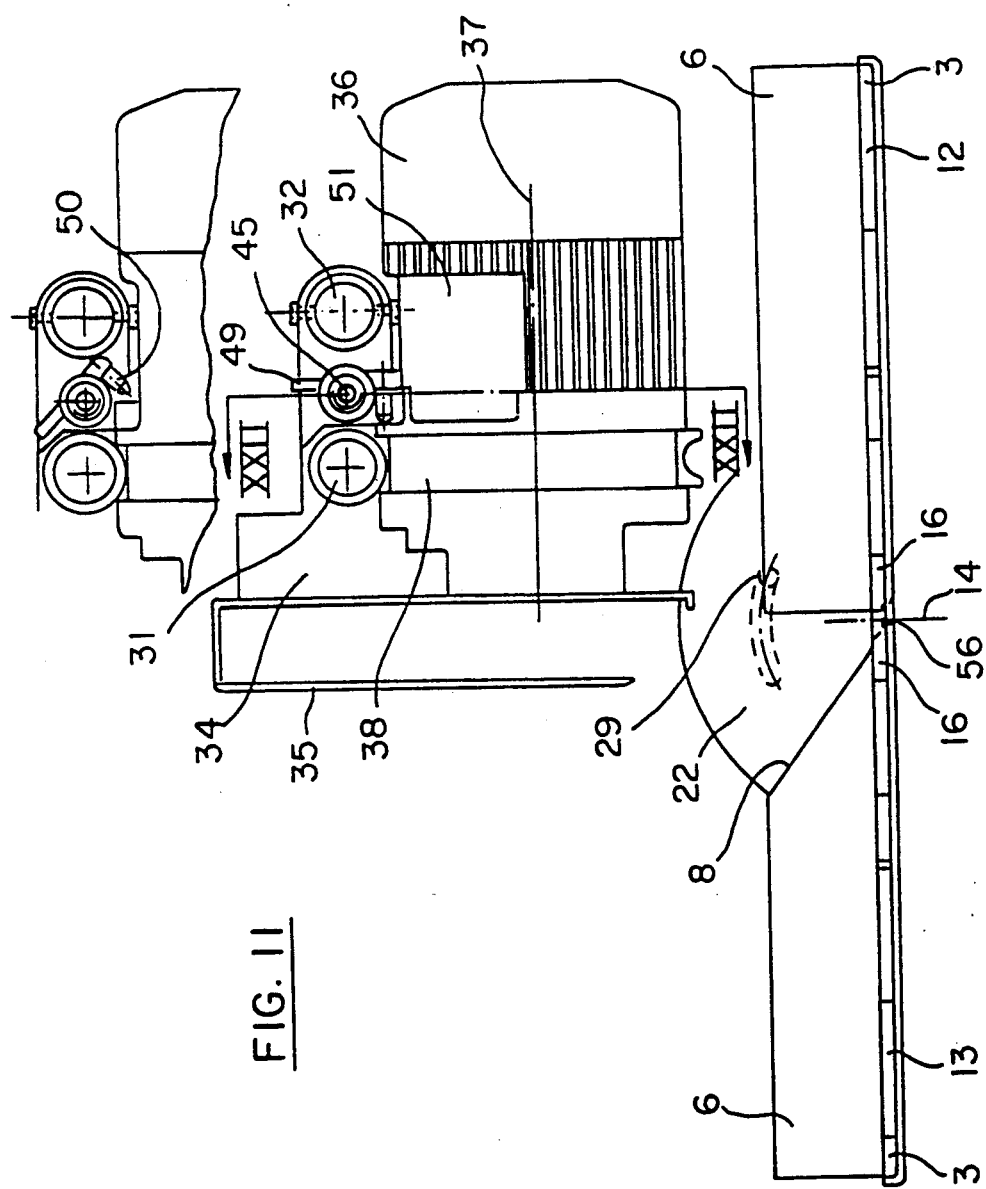
FIG. 11 shows in a partial representation the position of guide means, the slide element mounted to it with electric motor and protective cover, and the table plate, the pivoted stop of the limiting stop arrangement being recognizable in a separate partial representation.
Figure 13:
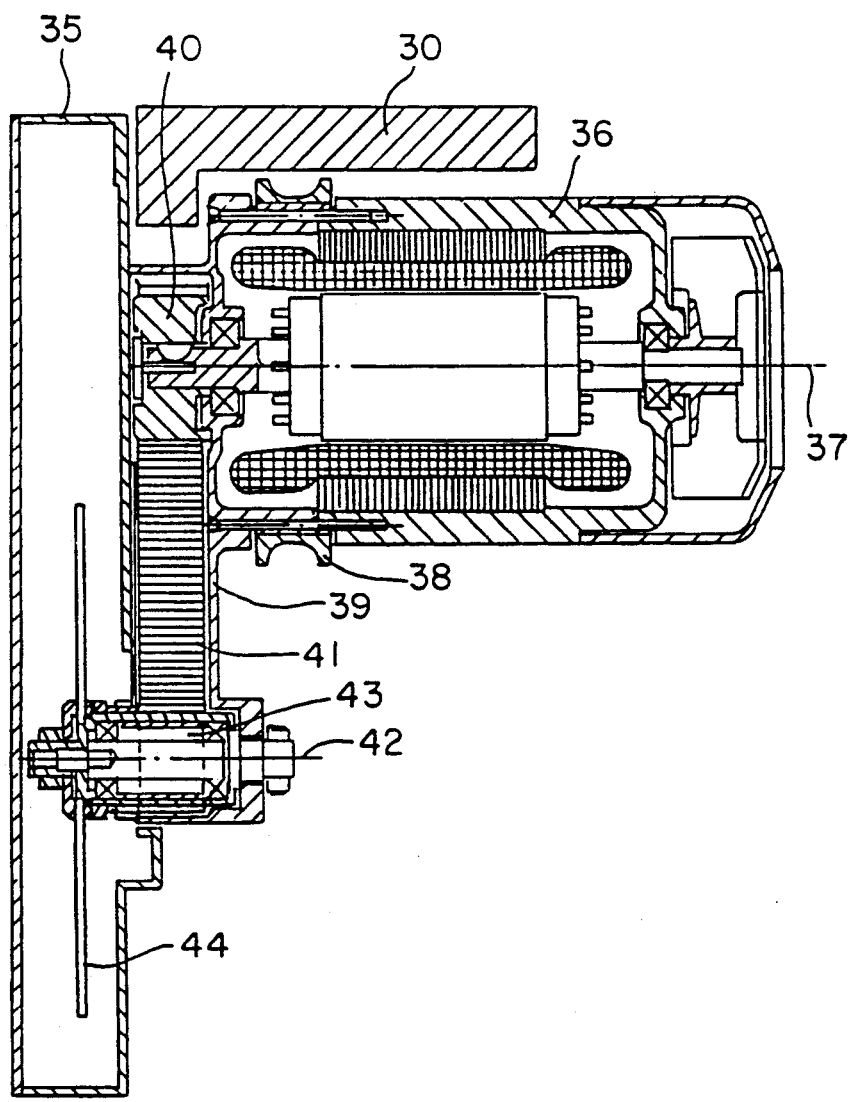
FIG. 13 shows a partial section essentially through the rotation axis of the saw blade and the centre axis of the electric motor of the saw unit in the position as per FIG. 4.
Figure 12:
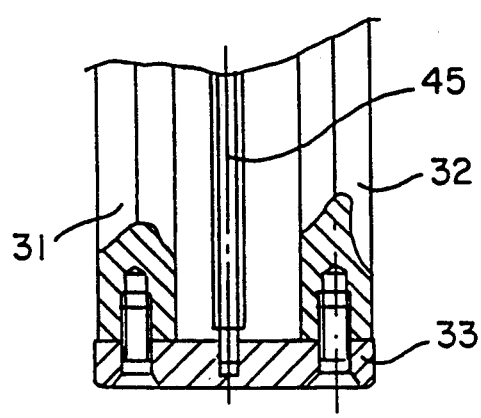
FIG. 12 shows, partly in section and partly as view the free end area of the guide means for the saw unit containing the saw blade.

In addition to the setting of mitre cuts, the saw blade 44 can be brought, by rotation of the support element 30 in the manner described above about the axis 56, into an inclined position relative to the main plane of the table plate 3 in order to make corresponding cut paths. In order that, in such an inclined position, the edge areas of the recess 7 in the fence 6 do not come into contact with the saw blade, the limiting edge 8 slopes, as shown in FIG. 11. Accordingly, the adjacent wall of the through-passage slot 17 is also inclined. The axis 56 about which the saw blade 44 is rotated into an inclined position lies at half height between the upper surface of the elongate section 16 of the support element 15 and the second side, i.e. the lower side in FIG. 11, of the table plate 3. The reason for this will be explained later.

Figure 18:
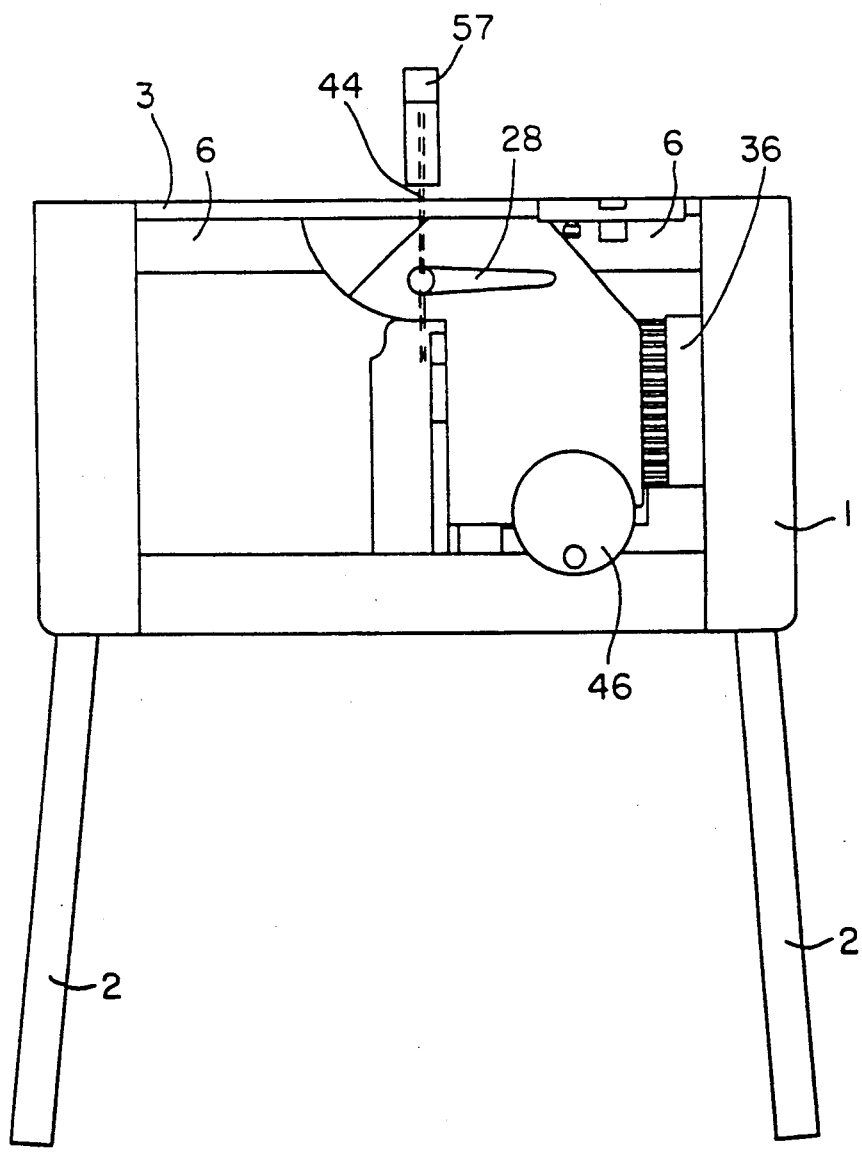
FIG. 18 shows the circular saw arrangement in a front view with the table plate located in the second position.
Figure 19:
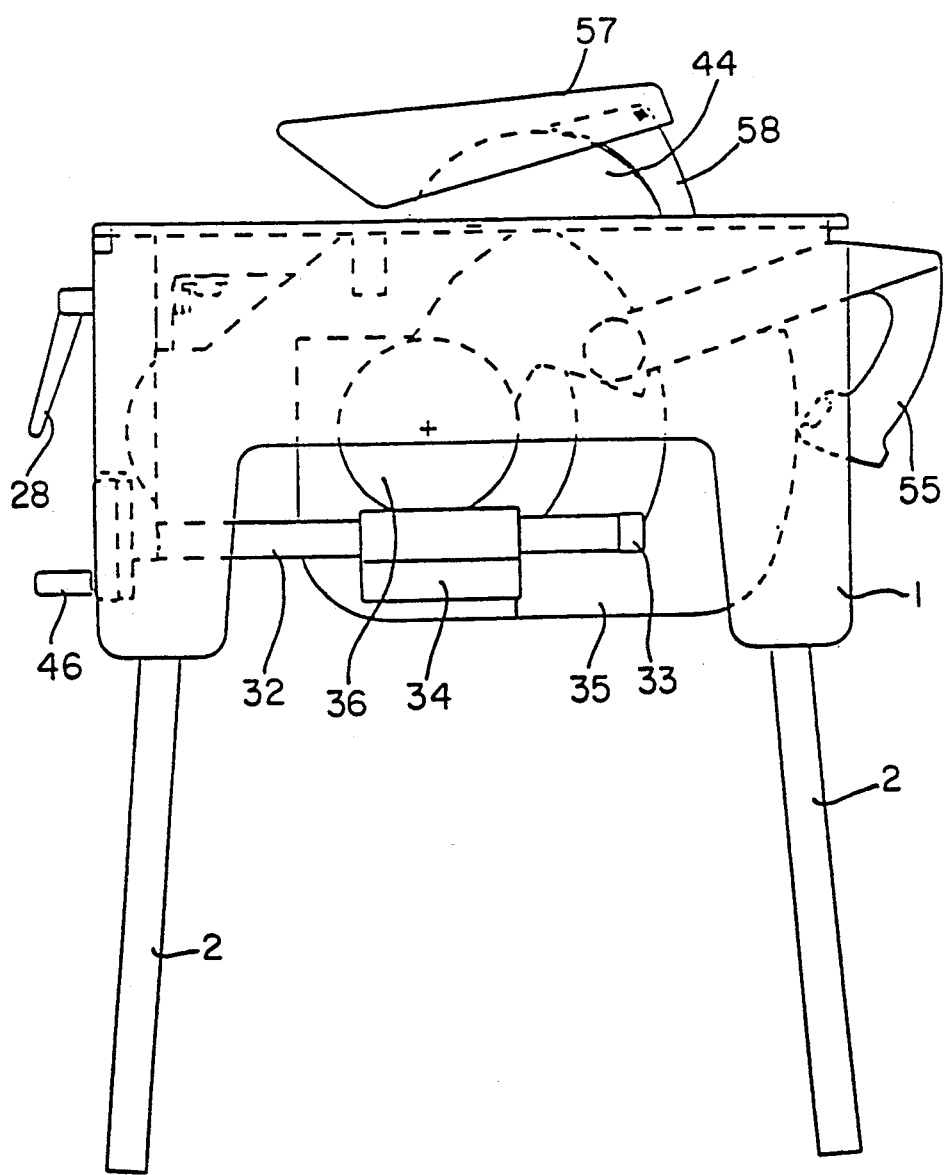
FIG. 19 shows a side view of the circular saw arrangement from FIG. 18.

As already mentioned, the table plate 3 is pivotable about the axis 5. If, therefore, the socket pins 4 are withdrawn in the position as per FIGS. 1 to 5, the table plate 3 can be rotated by 180 degrees, so that the second side of the table plate 3 is directed upwards, while the first side, and thus the support element 15 secured thereto, the guide means connected to the latter and the saw unit with electric motor 36 and saw blade 44 attached to the guide means are on the underside and thus within the frame 1, as shown in FIGS. 18 and 19. In this position, the socket pins 4 are re-inserted (FIG. 20) in order to fix the table plate relative to the frame 1. In this situation, the support element 15 must be in the centre position as per FIG. 6, so that the through-passage slot 17 is flush with the slot-shaped opening 10 present in the table plate 3. If, therefore, the stop element 49 is pivoted, in the manner indicated in the upper representation in FIG. 11, from the area of the stop face 52, the user can raise the saw blade 44, by raising the hand grip 55, through the through-passage slot 17 and the slot-shaped opening 10, so that a section of the saw blade 44 projects over the second side, now lying on top, of the table plate 3. This raising movement is accompanied by a corresponding pivoting of the electric motor 36 about its axis 37 until the stop recess 53 formed in the housing wall of the motor 36 is in the area of the stop 50. If the stop element 49 is then pivoted back and the stop 50 thus made to engage with the stop recess 53, the stop 50 supports the electric motor 36 and thus the saw blade 44 in a position projecting over the second side of the table plate 3.

Figure 21:
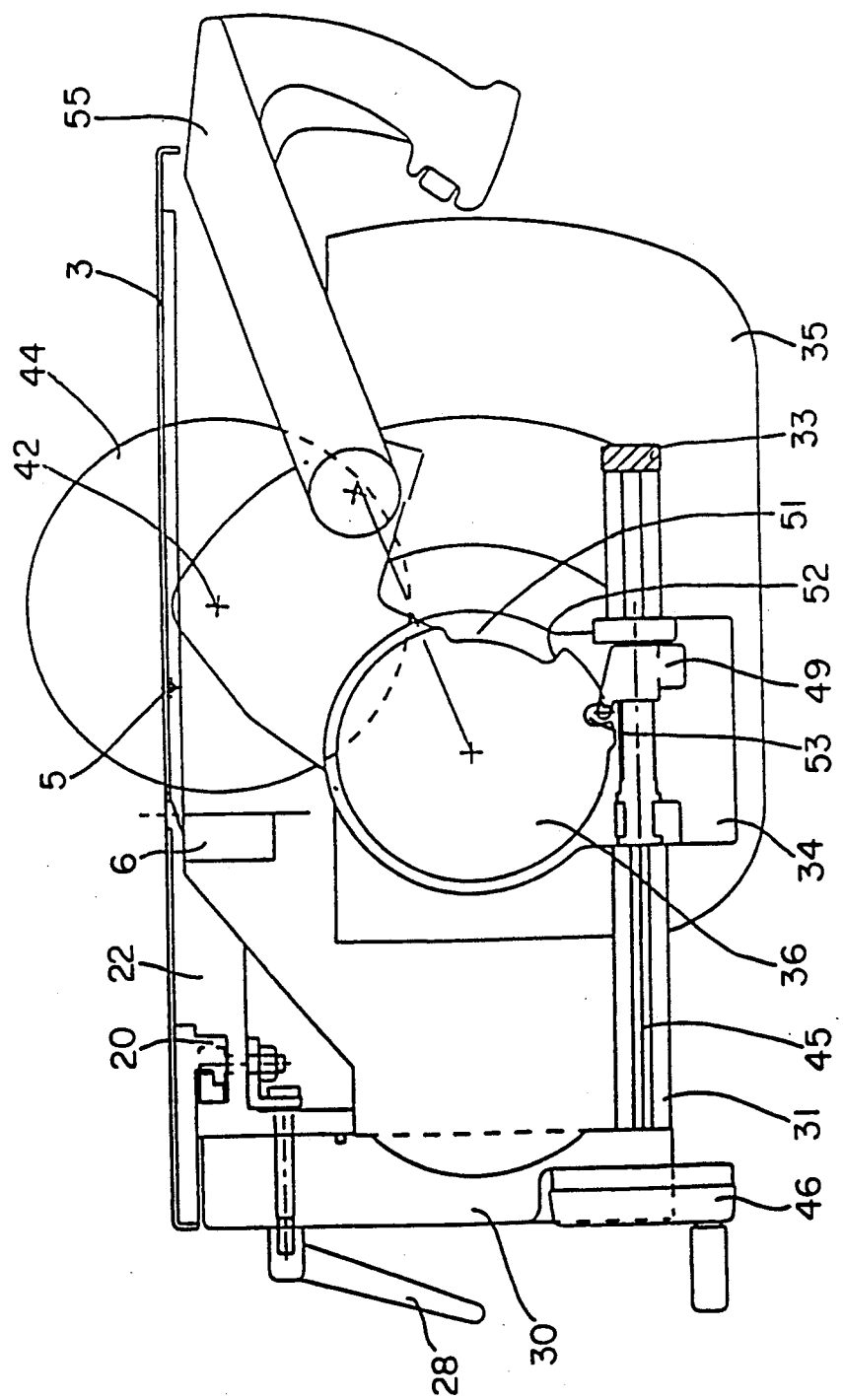
FIG. 21 shows the saw unit in a diagrammatic representation in the second position of the table plate with saw blade located in the sawing position.
Figure 22:
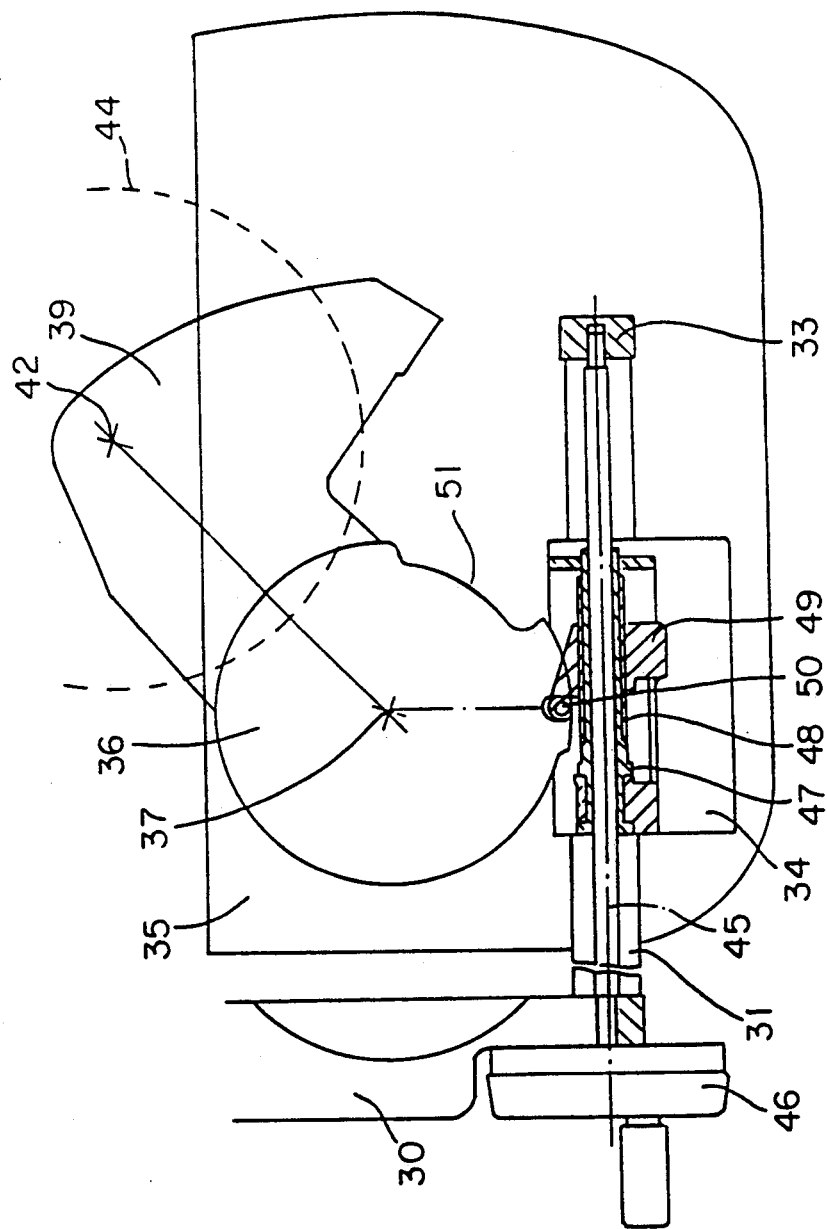
FIG. 22 shows, in a partial representation and partly in section along the line XII—XII from FIG. 11, the structure of the stop arrangement.

It is of course possible, by moving the stop element 49 along the adjusting bush 47, to fix a position of the saw blade 44 which is lower than the one according to FIG. 21, as is shown in FIG. 22.

Figure 20:
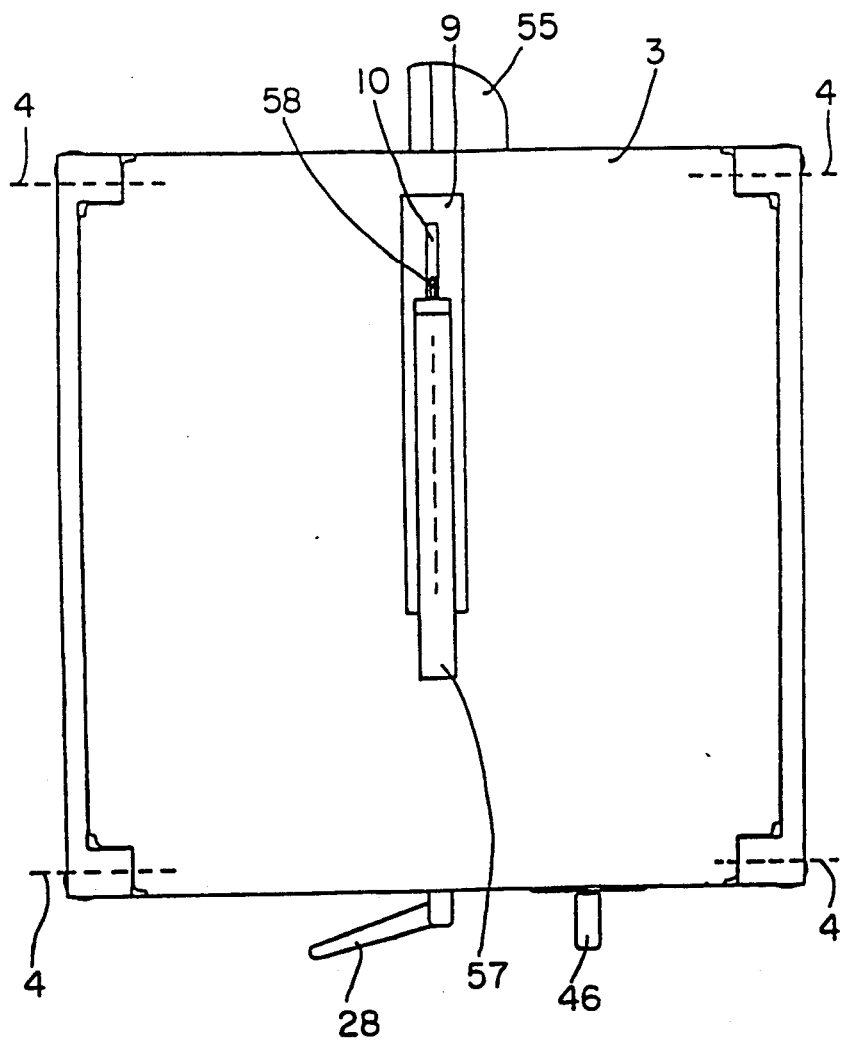
FIG. 20 shows a plan view of the circular saw arrangement according to FIGS. 18 and 19.

It should be mentioned that the safety regulations for the operation of a circular-saw bench formed as per FIGS. 18 to 20 require the presence of a riving knife 58 and a protective cover 57. Such a riving knife can be inserted for fitting from above through a section of slot-shaped opening 10 and through-passage slot 17 not filled by the saw blade 44 and secured to the protective cover 35 in a manner that is not shown. The protective cover 57 can be attached at the upper end of the riving knife 58. Fences can also be attached to the second side of the table plate 3 to guide the workpiece to be machined.

While it is naturally not possible, in the position as circular-saw bench as per FIGS. 18 to 20, to bring the saw blade 44 into a mitre position, the saw blade 44 can however be brought into an inclined position in the manner described by rotation about the axis 56, the procedure being the same as explained in connection with FIGS. 1 to 17. As indicated in FIG. 11, the side walls of the slot-shaped opening 10 can be correspondingly inclined for this purpose.

The fact that, as mentioned above, the axis 56 is arranged centrally relative to the total thickness of table plate 3 and support element 15, is advantageous in that the displacement movements of the saw blade 44 relative to through-passage slot 17 and slot-shaped opening 10 are, in the case of movement into an inclined position, the same in the position as per FIGS. 1 to 17 and in the position as per FIGS. 18 to 20, i.e. the widths of through-passage slot 17 and of slot-shaped opening 10 can be minimal.

Another consequence of the small material thickness of the area of the support element 15 containing the through-passage slot 17 and of the table plate 3 in the area of the recess 11 is that the saw blade 44 can, in the position as per FIGS. 18 to 20, project relatively far over the second side, serving as work surface, of the table plate 3.

The above described embodiments, of course, are not to be construed as limiting the breadth of the present invention. Modifications, and other alternative constructions, will be apparent which are within the spirit and scope of the invention as defined in the appended claims.

I claim:

1. A circular saw arrangement, comprising:
    a frame;
    a table plate mounted on the frame, the table plate having a first side and a second side;
    the table plate being pivotable between a first position in which said first side faces upwardly and a second position in which said second side faces upwardly;
    restraining means for non-movably connecting the table plate and the frame in said first and second positions of the table plate;
    a support element rotatably mounted to said first side of the table plate and extending across a part of said first side, said support element being rotatable about an axis of rotation;
    said support element having a through slot extending radially with respect to said axis of rotation;
    mounting means for connecting a saw unit containing a powered saw blade to the support element wherein in said first position of the table plate the saw blade can be moved downwardly from an elevated position for cutting of a workpiece;
    guide means connected to said mounting means, said guide means in said first position of the table plate permitting movement of the saw blade in a longitudinal direction of the through slot;
    stop means for limiting the downward movement of the saw blade from the elevated position to a lowered cutting position in which cutting position the saw blade extends into the through slot with a lowermost peripheral point of the saw blade above the area of the table plate covered by the support element;
    an opening in the table plate, said opening being overlaid by at least a part of the through slot of the support element in a center position of the saw blade;
    locking means for locking, when the table plate is in the second position, the saw blade in said center position in a sawing position in which a section of the saw blade extends through the through slot of the support element and through the opening of the table plate; and
    a stop adjustable in the direction of the movement of the saw blade in the longitudinal direction of the through slot which stop cooperates with a stop face which upon lowering of the saw blade is moved correspondingly and which limits the lowering movement of the saw blade by engagement with the stop.

2. The circular saw arrangement according to claim 1, wherein in the second position of the table plate said stop locks the saw blade in the cutting position by engagement with a stop recess.

3. The circular saw arrangement according to claim 1, wherein the distance between the mounting area for the saw unit on the support element and the rotation axis of the support element is smaller that the distance between the outer end of the through slot and the rotation axis of the support element, a recess for receiving the through slot containing section of the support element being provided at the first side of the table plate.

4. The circular saw arrangement according to claim 3, wherein the depth of said recess equals the height of the part of the support element received therein.

5. The circular saw arrangement according to claim 4, wherein the support element comprises an elongate section which extends in the direction of the through slot and contains at least the outer portion of the through slot.

6. The circular saw arrangement according to claim 5, wherein said elongate section of the support element extends from a round section in the middle of which the rotation axis is located.

7. The circular saw according to claim 1, wherein a fence arrangement is mounted on the first side of the table plate and located between the area for connecting the saw unit to the support element and the outer end of the through slot in the support element which outer end is farthest remote from said area of connection wherein in the center position of the saw blade a positioning face formed by the fence arrangement extends in parallel to the axis of rotation of the saw blade and is provided with a recess in the area adjacent to the saw blade.

* * * * *